United States Patent [19]

Ono et al.

[11] Patent Number: 5,909,023
[45] Date of Patent: Jun. 1, 1999

[54] ONLINE SHOPPING SUPPORT METHOD AND SYSTEM FOR SALES PROMOTIONS BASED ON THE PURCHASE HISTORY OF USERS

[75] Inventors: Toshiyuki Ono, Kawasaki; Tomomu Ishikawa, Kokubunji; Mitsuo Sudo, Tokyo, all of Japan; Akira Kagami, Somerville, Mass.

[73] Assignee: Hitachi, Ltd., Tokyo, Japan

[21] Appl. No.: 08/802,997

[22] Filed: Feb. 21, 1997

[30] Foreign Application Priority Data

Feb. 23, 1996 [JP] Japan .................................. 8-036697

[51] Int. Cl.⁶ ................................................ G06K 5/00
[52] U.S. Cl. .............................. 235/380; 705/14; 705/28
[58] Field of Search .................................. 235/380, 381, 235/383, 385; 705/14, 26, 27, 28, 10

[56] References Cited

U.S. PATENT DOCUMENTS

| | | | |
|---|---|---|---|
| 4,984,155 | 1/1991 | Geier et al. | 235/381 |
| 5,237,620 | 8/1993 | Deaton et al. | 235/380 |
| 5,267,171 | 11/1993 | Suzuki et al. | 364/479 |
| 5,717,854 | 2/1998 | Wa et al. | 395/200.2 |
| 5,724,522 | 3/1998 | Kagami et al. | 395/226 |

OTHER PUBLICATIONS

"Internet Magazine", published by Impress Corporation, Apr. issue of 1995, pp. 116–121.

*Primary Examiner*—Donald Hajec
*Assistant Examiner*—Diane I. Lee
*Attorney, Agent, or Firm*—Antonelli, Terry, Stout & Kraus, LLP

[57] ABSTRACT

An online shopping support method and system capable of supplying proper services matching user specific needs and conditions. Purchase history information of each good purchased by each user is stored at a service offering system. In response to an input of identification information from a service use system, the service offering system searches the purchase history information of the user corresponding to a user identifier and calculates a purchase interval of each good purchased by the user. The service offering system judges, for each good whose purchase interval was calculated, whether the time corresponding to the purchase interval has lapsed after the latest purchase day. The service offering system transmits information of the good whose time corresponding to the purchase interval has lapsed to the service use system via a communication network and displaying the information at the service use system.

16 Claims, 9 Drawing Sheets

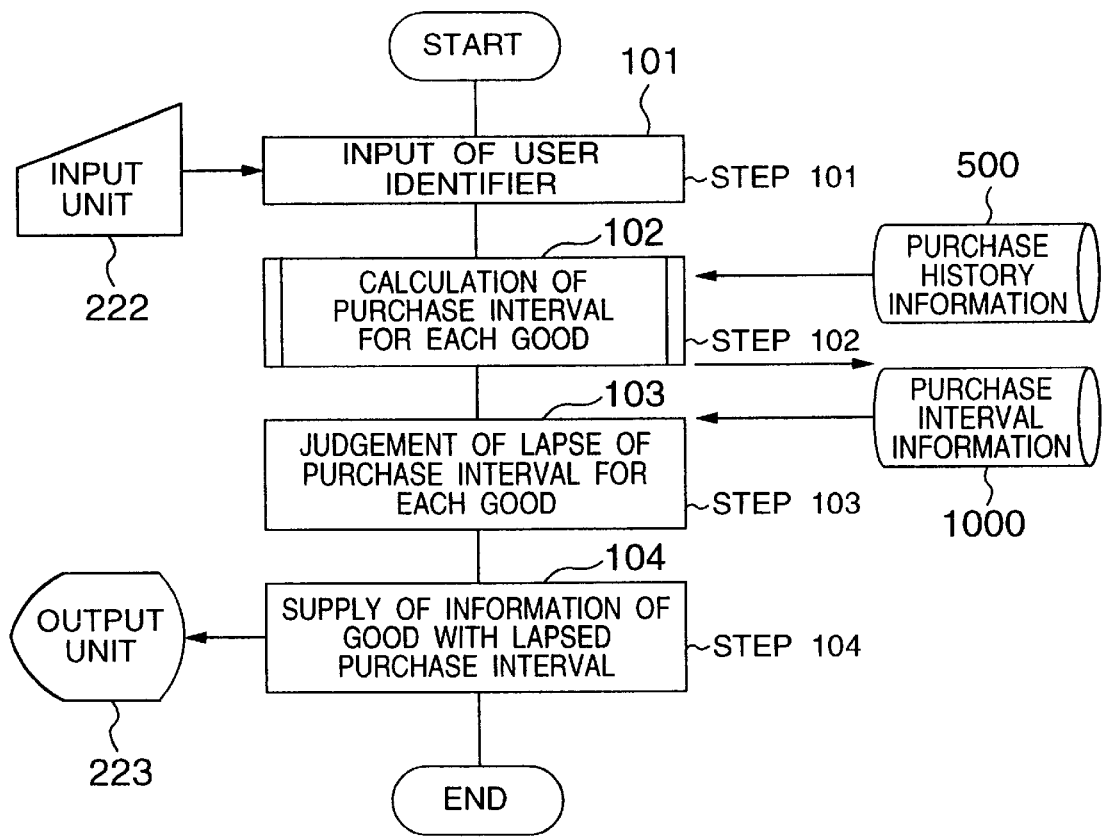
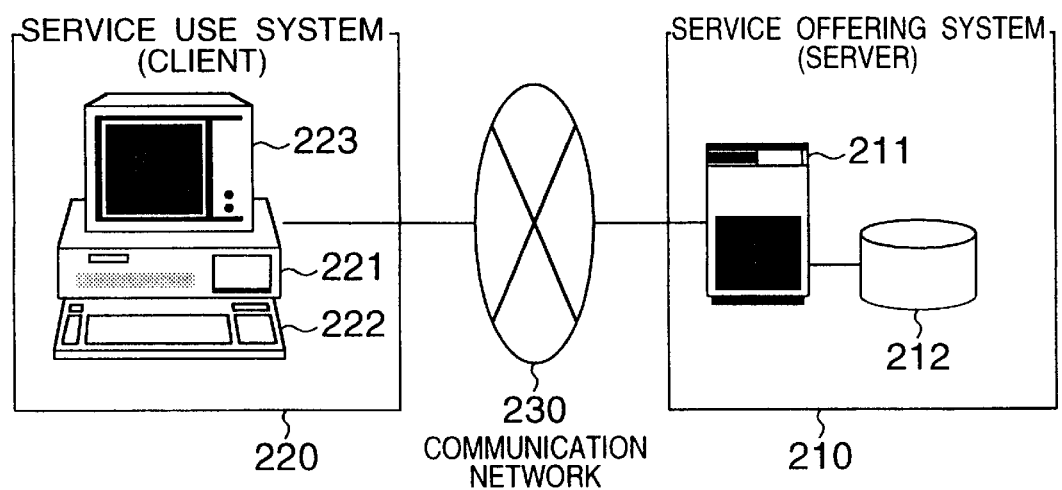

FIG.4
USER IDENTIFIER INPUT SCREEN

ABC ONLINE SHOPPING SERVICE

WELCOME TO ABC
ENTER USER CODE AND PASSWORD

USER CODE

PASSWORD

~401

FIG.5
PURCHASE HISTORY INFORMATION FILE

USER CODE 91-1236
USER CODE 91-1235
USER CODE 91-1234 ~501

| PURCHASE DAY | MERCHAN-DISE GROUP | MERCHAN-DISE CODE | PURCHASE FREQUENCY | PURCHASE MONEY AMOUNT |
|---|---|---|---|---|
| 94/06/08 | DAIRY PRODUCTS | 1234 | 4 | 904 |
| 94/06/11 | CLEANING MATERIALS | 1102 | 2 | 848 |
| 94/06/11 | BREAD | 1203 | 3 | 998 |
| 94/06/21 | VEGETABLE | 1206 | 1 | 548 |
| 94/07/02 | DAIRY PRODUCTS | 1234 | 2 | 452 |
| 94/07/21 | CLEANING MATERIALS | 1102 | 2 | 848 |
| 94/08/07 | DAIRY PRODUCTS | 1234 | 2 | 452 |

511
512
513

502  503  504  505  506

FIG.6
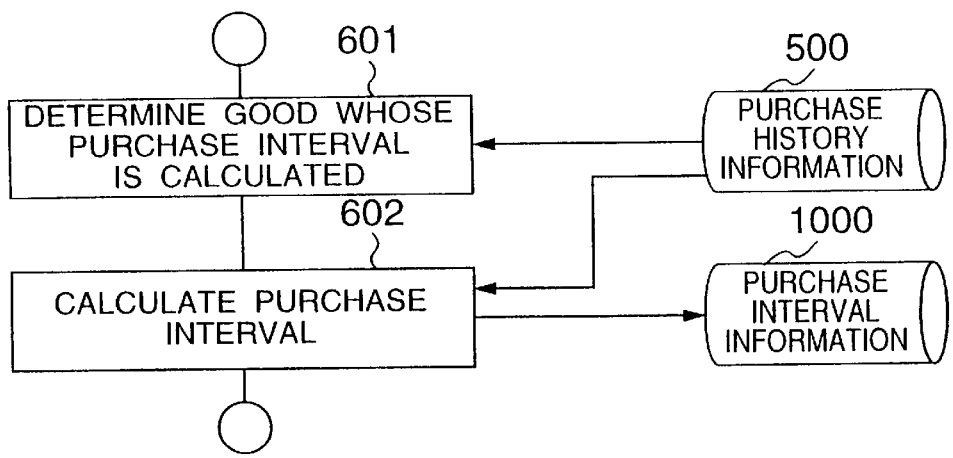
FIG.7
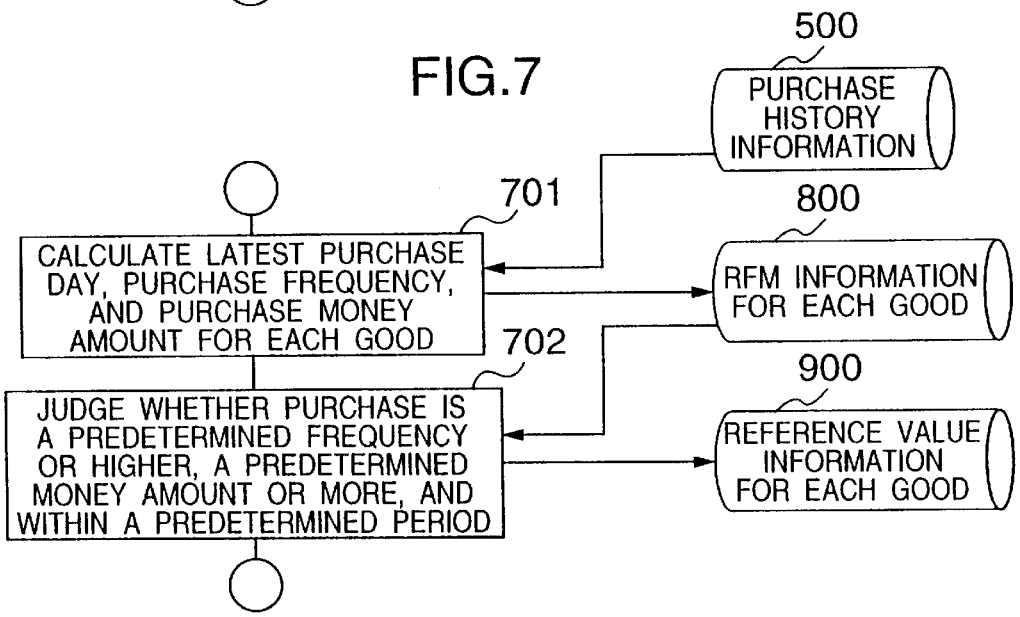
FIG.8
| MERCHANDISE CODE | LATEST PURCHASE DATE | PURCHASE FREQUENCY | TOTAL PURCHASE MONEY AMOUNT |
|---|---|---|---|
| 1234 | 94/08/07 | 6 | 12,500 |
| 1102 | 94/09/11 | 4 | 30,500 |
| 1203 | 94/09/11 | 3 | 9,500 |
| 1206 | 94/09/21 | 2 | 8,700 |
| 1300 | 94/09/21 | 3 | 1,280 |
| 1102 | 94/09/21 | 2 | 94,000 |
| 1102 | 94/09/27 | 5 | 11,000 |
~800
801   802   803   804

| MERCHANDISE CODE | PURCHASE DAY | PURCHASE FREQUENCY | TOTAL PURCHASE MONEY AMOUNT | REFERENCE VALUE ~900 |
|---|---|---|---|---|
| 1234 | 60 | 4 | 10,000 | |
| 1102 | 30 | 5 | 20,000 | |
| 901 | 902 | 903 | 904 | |

| MERCHANDISE CODE | PURCHASE INTERVAL |
|---|---|
| 1234 | 30 |
| 1102 | 40 |
| 1203 | 32 |
| 1206 | 20 |
| 1300 | 13 |
| 1102 | 21 |
| 1102 | 5 |
| 1001 | 1002 |

~1000 PURCHASE INTERVAL INFORMATION

MERCHANDISE INFORMATION SUPPLY SCREEN

GENERAL MERCHANDISE SUPPLY SCREEN

ORDER INFORMATION CONFIRMATION SCREEN

ONLINE SHOPPING SUPPORT METHOD AND SYSTEM FOR SALES PROMOTIONS BASED ON THE PURCHASE HISTORY OF USERS

BACKGROUND OF THE INVENTION

1. Field of the Invention

The present invention relates to an online shopping support method and system using communication networks such as a personal computer based communication network and an interactive cable TV network, and more particularly to an online shopping support method and system for supplying each user with merchandise information by utilizing a database of the purchase history of users.

2. Description of the Related Art

In a conventional online shopping system using a personal computer based communication network or the like, a service offering side (or merchandise selling side) supplies merchandise information in response to a merchandise search request from a user.

For example, for a shopping mall on the Internet described in "Internet Magazine" published by Impress Corporation, April issue of 1995, pp. 116–121, merchandise information is systematically arranged in a menu style and a user searches information of a desired product or good in a hierarchical manner. Alternatively, a user enters a keyword of a desired good to retrieve merchandise information matching the keyword from a database of merchandise information at the service offering side.

As online shopping using multimedia and networks prevails, a variety of merchandise such as daily necessities is sold online. Users buy a variety of merchandise at a considerable frequency through online shopping.

In conventional online shopping, however, the service offering side provides merchandise information in a uniform menu style, and is unable to provide services suitable for user specific needs or conditions.

On the service user side, merchandise information is searched by using a uniform menu. Therefore, as daily necessities or the like are bought at a considerable frequency, it can be anticipated some merchandise may sometimes be forgotten at the time of a purchase.

SUMMARY OF THE INVENTION

It is an object of the present invention to provide an online shopping support method and system capable of supplying services suitable for user specific needs and conditions.

According to the characteristic feature of the invention which achieves the above object, basically a service offering side stores a merchandise purchase history for each user and calculates a merchandise purchase interval of each product or good in accordance with the purchase history, to thereby estimate a demand occurrence time for each good and supply a user with the merchandise information at the estimated time of the next purchase.

According to one aspect of the present invention, an online shopping support method for an online shopping support system including a service offering system, a service use system, and a communication network is provided in which, in response to a shopping request from the service use system, the service offering system executes an online shopping process including a merchandise information offering process and an order accepting process. The method comprises the steps of: on the side of the service offering system, storing purchase history information of each good purchased by each user; on the side of the service offering system, in response to an input of identification information including a user identifier by the service use system, searching the purchase history information of the user corresponding to the user identifier and calculating a purchase interval of each good purchased by the user; on the side of the service offering system, judging for each good whose purchase interval was calculated whether the time corresponding to the purchase interval has lapsed after the latest purchase day when the identification information is input; and on the side of the service offering system, in accordance with the judgement results, transmitting information of the good whose time corresponding to the purchase interval has lapsed to the service use system via the communication network and displaying the information at the service use system.

According to another aspect of the present invention, an online shopping support system including a service offering system, a service use system, and a communication network is provided in which, in response to a shopping request from the service use system, the service offering system executes an online shopping process including a merchandise information offering process and an order accepting process. The service offering system of the online shopping support system comprises: means for storing purchase history information of each good purchased by each user; means for searching, in response to an input of identification information including a user identifier by the service use system, the purchase history information of the user corresponding to the user identifier from the storing means; means for calculating a purchase interval of each good purchased by the user in accordance with the searched purchase history information; means for judging for each good whose purchase interval was calculated whether the time corresponding to the purchase interval has lapsed after the latest purchase day at the time when the identification information is input; and means for transmitting, in accordance with the judgement results, information of the good whose time corresponding to the purchase interval has lapsed to the service use system via the communication network and displaying the information at the service use system.

Products/goods whose purchase intervals are calculated may include:

(1) a product or good whose purchase frequency is a predetermined purchase frequency or higher, the purchase frequency being calculated from the purchase history information of each user stored at the service offering system;

(2) a product or good whose latest purchase day is a predetermined day or later, the latest purchase day being calculated from the purchase history information of each user stored at the service offering system;

(3) a product or good whose purchase amount of money is a predetermined amount or more, the purchase amount of money being calculated from the purchase history information of each user stored at the service offering system; and other product or goods.

The purchase interval may be:

(1) an average interval of purchase days of merchandise purchased by a user;

(2) an average interval of purchase days per merchandise product or good purchased by a user, which interval is then multiplied by the number of goods purchased at the latest purchase day;

(3) an interval of purchase days of each merchandise group containing at least two product or goods different in brand names but belonging to the same kind of merchandise; and other intervals.

The timing of calculating the purchase interval may be:

(1) when a user identifier is input;

(2) after a series of shopping processes such as a settlement type is established; and other timings.

Other objects, features and advantages of the present invention will become apparent from the description of the following embodiments taken in conjunction with the accompanying drawings.

BRIEF DESCRIPTION OF THE DRAWINGS

FIG. 1 is a flow chart illustrating the operation of an online shopping support method according to a first embodiment of this invention.

FIG. 2 is a schematic diagram showing the structure of a system realizing the first embodiment of the invention.

FIG. 4 is an illustrative diagram showing an example of a screen for inputting a user identifier.

FIG. 5 is a diagram showing an example of a file structure of purchase history information.

FIG. 6 is a flow chart illustrating the process of calculating a purchase interval of each good.

FIG. 7 is a flow chart illustrating the process of determining a good whose purchase interval is to be calculated.

FIG. 8 is a table showing an example of a file structure of latest purchase day, purchase frequency, and purchase amount of money, respectively of merchandise.

DETAILED DESCRIPTION OF THE PREFERRED EMBODIMENTS

Figure 3:
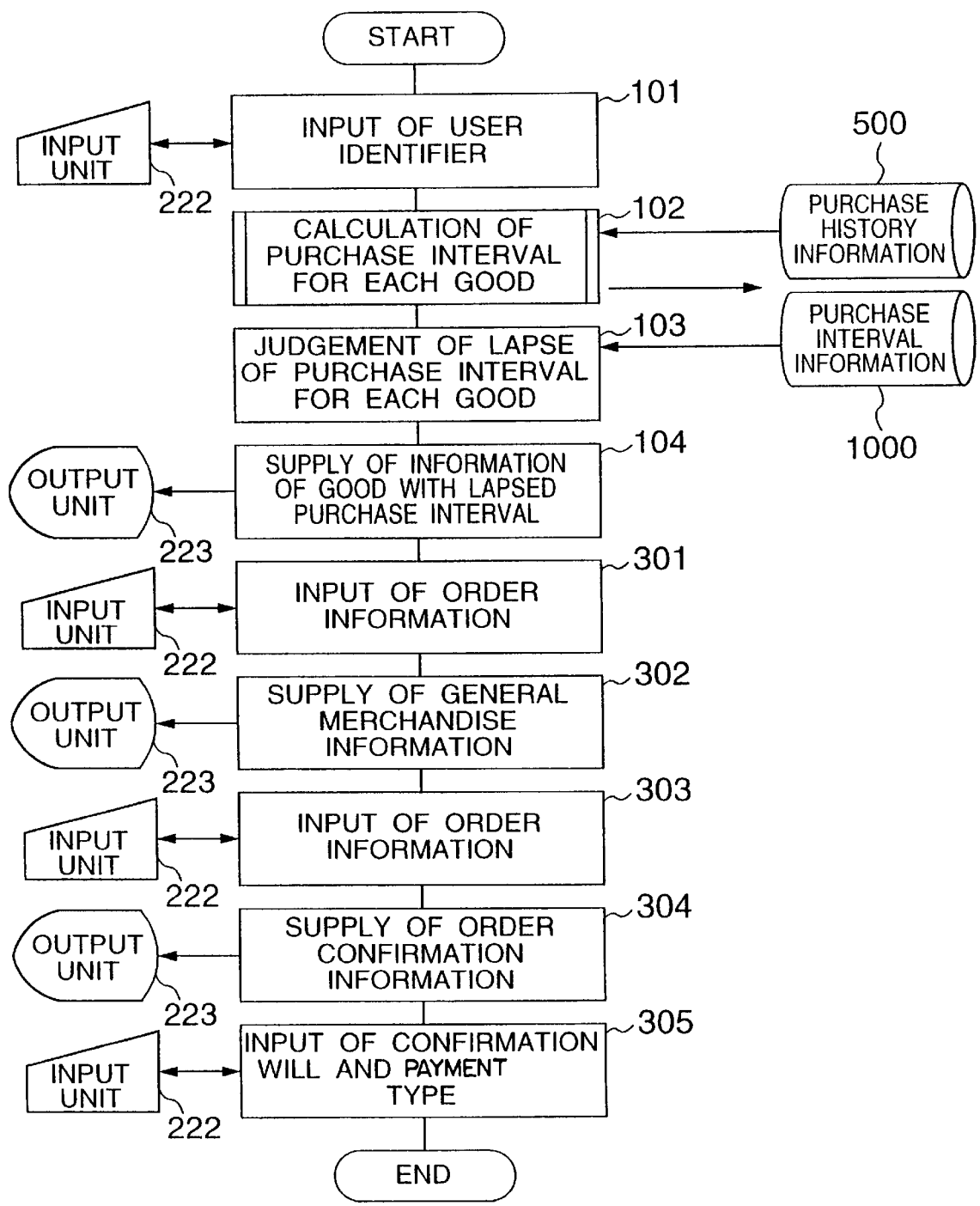
FIG. 3 is a flow chart illustrating the detailed processes to be executed by the first embodiment.

Embodiments of the invention will be described in detail with reference to the accompanying drawings.

FIG. 1 is a flow chart illustrating the operation of an online shopping support method according to a first embodiment of this invention.

FIG. 2 is a schematic diagram showing the structure of an online shopping support system realizing the first embodiment of the invention.

The system shown in FIG. 2 includes a service offering system (hereinafter called a server) 210, a service use system (hereinafter called a client) 220, and a communication network 230 interconnecting the server 210 and client 220.

The server 210 includes a computer 211 and a storage device 212 connected to the computer 211. The client 220 includes a computer 221, an input unit 222, and an output unit 223.

It is preferable that the server 210 has a computer capable of processing data at high speed in order to supply services to a plurality of clients 220 at the same time and a storage device 212 capable of storing a large capacity of user information in order to deal with a variety of services. For example, a large computer or a high performance work station is preferably used.

The client 220 may includes a general computer system capable of connecting a communication network. For example, a personal computer (PC) or a television with interactive communication function is used.

The communication network 230 may be a network having the functional equivalent of a public network or ISDN.

With reference to FIG. 2, the operation of the first embodiment will be described in connection with the flow chart shown in FIG. 1.

To start online shopping, a user enters a user identifier (ID) from the input unit 222 of the client 220.

The input user identifier is transmitted via the communication network 230 to the server 210.

The user identifier transmitted from the client 220 is therefore input to the server 210 (Step 101).

The server 210 searches the purchase history information of the user corresponding to the user identifier from purchase history information 500 stored in the storage device 212 in the form of database or file. In accordance with the searched purchase history information, purchase intervals of merchandise the user purchased in the past are calculated (Step 102).

Next, the server 210 judges, for each product or good whose purchase interval was calculated, whether the time corresponding to the purchase interval calculated at Step 102 has lapsed after the latest purchase day (Step 103).

The server 210 then transmits information of each good whose time corresponding to the purchase interval has lapsed, via the communication network 230 to the client 220 to display it on the output unit 223 (Step 104).

With the above operations, the output unit 223 of the client 220 displays a list of goods which the user does not have in stock or has a low supply thereof. Without an operation of selecting a desired good following specific menus, a user can easily select and order a desired good (or a good presumably desired from the past state of consumption). Further, the number of goods which is forgotten to be purchased is significantly reduced.

A series of processes up to the end of an order process will be detailed with reference to the flow chart of FIG. 3.

Step 101: Input of user identifier.

A user identifier input screen 401 shown in FIG. 4 is displayed in advance on the output unit 223 of the client 220. The user enters a user identifier from the input device 222.

The user identifier generally includes of a user name and a password for verification. The input user identifier is transmitted via the communication network 230 to the server 210.

Step 102: Calculation of purchase interval for each good.

By using the user identifier received from the client 220 as a search key, the server 210 refers to the purchase history information 500 stored in the storage device 212 in the form of database or file to calculate the purchase interval of each good purchased by the user.

FIG. 5 shows the structure of the purchase history information 500. The purchase history information 500 file includes a user identifier field 501, a purchase date field 502 indicating a purchase day of a product, a merchandise group field 503 indicating the kind of purchased products, a merchandise code field 504, a purchase number field 505, and a purchase money amount field 506.

By using the user identifier as a search key, the server 210 first searches the purchase history information 500 file having the matched user identifier field 501.

The process of calculating a purchase interval for each good by using the purchase history information of the user includes, as detailed in FIG. 6, a process (Step 601) of determining a good whose purchase interval is to be calculated and a process (Step 602) of calculating the purchase interval of each determined good.

Step 601: Determination of good whose purchase interval is to be calculated.

Goods whose purchase intervals are calculated may be all products or goods the user purchased in the past. However, it is preferable to supply information for products or goods which are more likely to be purchased by the user.

FIG. 7 is a flow chart illustrating a process of selecting only those products or goods having a higher purchase frequency or the like in accordance with the purchase state of each good.

Step 701: Calculation of latest purchase, purchase frequency, and purchase amount of money, respectively of each good.

By using the purchase history information 500, the latest purchase dates (Recently), purchase frequencies (Frequency), and purchase amounts of money for respective merchandise codes 504 are collected and calculated.

FIG. 8 shows an example of the file structure of calculated merchandise RFM (Recently, Frequency, Money) information 800. The merchandise RFM information 800 table includes a merchandise code field 801, a latest purchase day field 802, a purchase frequency field 803, and a total purchase money amount field 804.

Step 702: Judgement of whether purchase is at a predetermined frequency or higher, with a predetermined amount of money or more, or within a predetermined period.

In accordance with the information of the latest purchase dates, purchase frequencies, and purchase amounts of money for each good calculated at Step 701, it is judged for each good whether the purchase satisfies predetermined reference values, i.e., a predetermined frequency or higher, a predetermined amount of money or more, or within a predetermined purchase period.

Figures 9, 10, 11:
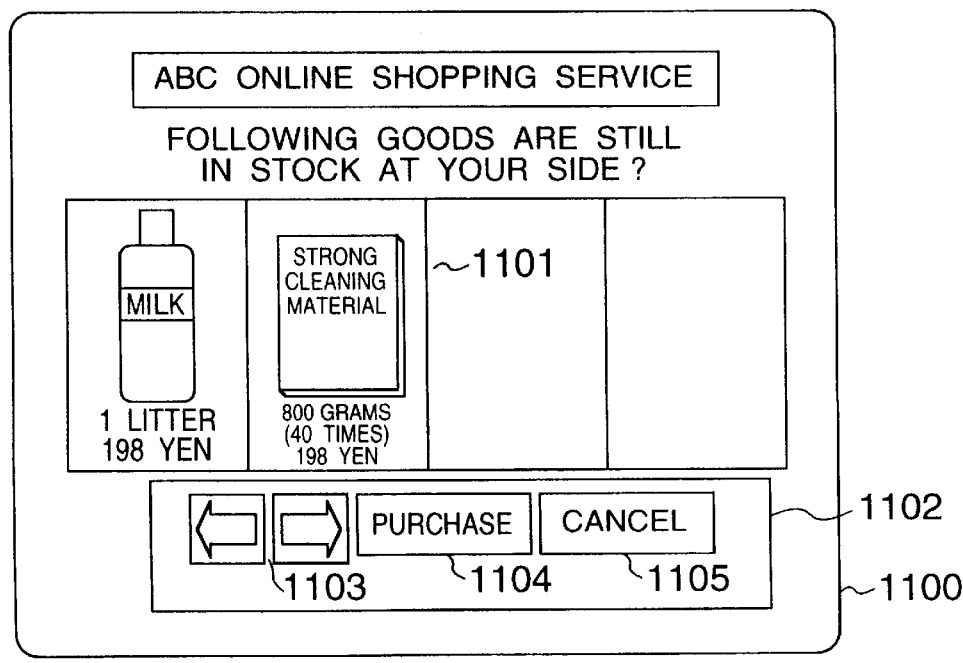
FIG. 9 is a table showing an example of a file structure of reference value information including purchase day, purchase frequency, and purchase amount of money.
FIG. 10 is a table showing an example of a file structure of purchase interval information of merchandise.
FIG. 11 is an illustrative diagram showing an example of a screen for supplying merchandise information specific to each user.

FIG. 9 shows an example of the structure of a file for storing reference value information 900 of reference values for each good. The reference value information 900 file contains a merchandise code field 901, a purchase day field 902, a purchase frequency field 903, and a total purchase money amount field 904, and stores reference values of a purchase interval, a purchase frequency, and a total purchase money amount, for each merchandise code. The reference values are set on the basis of merchandise properties, environments, actual sales, sales strategies, and the like.

If each good satisfies the reference value, this good is determined as a subject whose purchase interval is calculated.

The reference values can be set on the side of the server 210. All of the reference values or just one of them may be used for determining the good whose purchase interval is calculated. The reference values may be set for each good, each user, or common for all goods or all users.

Step 602: Calculation of purchase interval.

The server 210 calculates the purchase interval in accordance with the purchase history information 500 of a good which is determined as a subject whose purchase interval is calculated.

One example of a method of calculating the purchase interval T is given in the following equation:

$$T = (Tn - Ti)/(n-1) \qquad (1)$$

where $Ti$ indicates the date when goods were purchased at the i-th time (i=1~n), n indicates a merchandise purchase frequency, and T is the purchase interval whose figures lower than the decimal point are rounded down.

In the example shown in FIG. 5, records for the merchandise code "1234" are records 511, 512, and 513, and the corresponding purchase dates are June 8, July 2, and August 7. The purchase interval is therefore (August 7–June 8)/(3–1)=60 days/2=30 days.

FIG. 10 shows an example of the structure of a file for storing calculated purchase interval information 1000 for each products or good. The purchase interval information 1000 file contains a merchandise code field 1001 and a purchase interval field 1002.

The purchase interval information 1000 for each products or good calculated at Step 602 is stored in the file having the structure shown in FIG. 10.

As another example of the method of calculating the purchase interval T, there is a method of calculating an average purchase interval per products or good while taking the number of purchased products or goods into consideration.

One example of a method of calculating an average purchase interval L per good is given in the following equation:

$$L = (Tn - Ti)/\Sigma mi \qquad (2)$$

where $Ti$ indicates the day when goods were purchased at the i-th time (i=1~n), $mi$ indicates the number of goods purchased at the i-th time, and T is the purchase interval whose figures lower than the decimal point are rounded down.

In the example shown in FIG. 5, records for the merchandise code "1234" are records 511, 512, and 513, and the corresponding purchase dates and the number of purchased goods are June 8, four goods, July 2, two goods, and August 7, two goods. The average purchase interval per good is therefore (August 7–June 8)/(4+2)=10 days. Since the number of goods purchased at the preceding time is two, the purchase interval to the succeeding time is 10 days×2=20 days.

As set forth above, the average purchase interval is calculated by considering the number of goods purchased by a user. Therefore, an actual consumption speed of the user can be estimated more definitively and accordingly the merchandise information can be supplied at appropriate timings.

As the purchase interval T, a purchase interval calculated in the past, e.g., the purchase interval in the same period of the last year, may be used. This purchase interval is effective for merchandise of which the state of consumption by a user depends upon particular seasons.

The purchase interval is calculated in order to determine appropriate timings for supplying merchandise information. If necessary or appropriate, the calculated purchase interval may be modified in the range of several days.

Step 103: Judgement of lapse of purchase interval.

The server 210 judges for all products or goods whose purchase intervals were calculated at Step 102 whether the time corresponding to the purchase interval has lapsed. An example of this judgement method is given by the following formula:

$$(\text{latest purchase day of good}) + (\text{purchase interval}) \geq (\text{current day}) \quad (3)$$

Step 104: Supply of merchandise information for good with lapsed purchase interval.

Merchandise information for goods whose purchase interval was judged to have lapsed at Step 103 is transmitted via the communication network 230 to the client 220.

The client 220 displays a merchandise information supply screen 1100 on the output unit 223.

FIG. 11 shows an example of the merchandise information supply screen 1100.

The merchandise information supply screen 1100 has an area 1101 for supplying information of specific goods a user possibly wants to buy presently, and a command area 1102. Displayed in the specific merchandise information supply area 1101 is merchandise information of goods whose purchase intervals have lapsed.

The command area 1102 has a merchandise information selection button 1103, a purchase button 1104, and a cancel button 1105.

Step 301: Input of order information.

A user of the client 220 enters from the input unit 222 information whether or not any good is to be purchased. Specifically, if there is any desired good in the merchandise information displayed in the information supply area 1101, the merchandise information for its good is selected by using the merchandise information selection button 1103 to enter a purchase will of the user by using the purchase button 1104.

If the good once purchased is to be cancelled, the merchandise information for the good is again selected by the merchandise selection button 1103 to cancel the purchase by using the cancel button 1105.

The entered order information is transmitted via the communication network 230 to the server 220.

Step 302: Supply of information of general merchandise.

The server 210 supplies a user of the client 220 with general merchandise information via the communication network 230.

Figure 12:
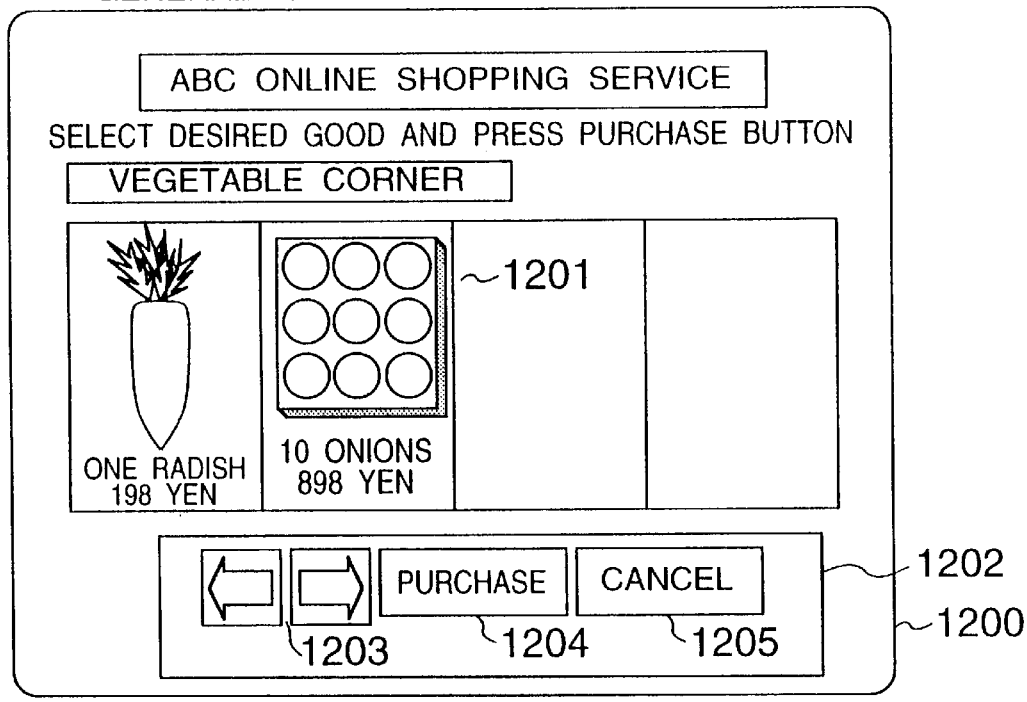
FIG. 12 is an illustrative diagram showing an example of a screen for supplying general merchandise information.

The client 220 displays on the output unit 223 a general merchandise information supply screen 1200 such as that shown in FIG. 12.

The merchandise information supply screen 1200 has a general merchandise information supply area 1201 and a command area 1202. The command area 1202 has a merchandise information selection button 1203, a purchase button 1204, and a cancel button 1205.

Step 303: Input of order information.

A user of the client 220 enters from the input unit 222 information as to whether or not any general product or good displayed in the information supply area 1201 is purchased. Specifically, if there is any good to be purchased, the merchandise information for its good is selected by using the merchandise information selection button 1203 to enter a purchase will of the user by using the purchase button 1204.

If the good once purchased is to be cancelled, the merchandise information for the good is again selected by the merchandise selection button 1203 to cancel the purchase by using the cancel button 1205.

The entered order information is transmitted via the communication network 230 to the server 220.

Step 304: Supply of order confirmation information.

The server 210 transmits confirmation information of orders received at Steps 301 and 302 to the client 220 via the communication network 230.

Figure 13:
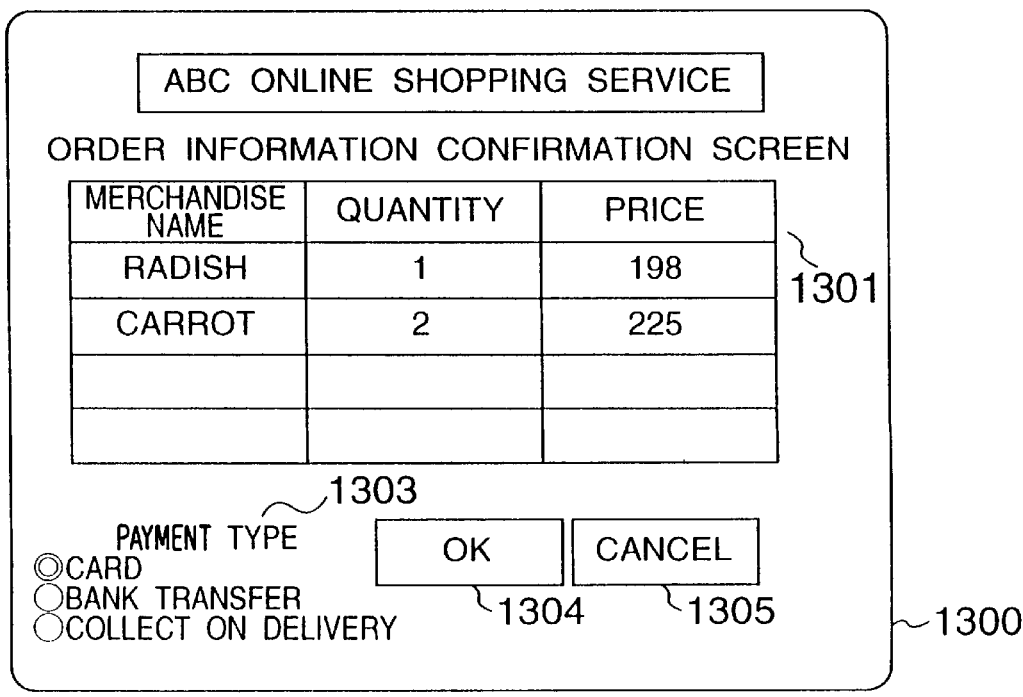
FIG. 13 is an illustrative diagram showing an example of a screen for confirming orders.

The client 220 displays on the output unit 223 an order information confirmation screen 1300 such as that shown in FIG. 13.

The order information confirmation screen 1300 has an ordered good display area 1301, a settlement input area 1303, an OK button 1304, and a cancel button 1305.

Step 305: Input of payment type and confirmation will.

Observing the order information confirmation screen 1300, the user of the client 220 enters a payment type and a confirmation will from the input unit 222.

One of the payment types, including card payment, bank transfer, collect on delivery, and the like is selected from the payment type area 1303 and a confirmation will is entered by using the OK button 1304.

The entered information is transmitted via the communication network 230 to the server 220.

According to the above embodiment, the following series of online shopping procedures is executed. As a user identifier is transmitted from the client 220, the server 210 searches the purchase history information 500 of the user corresponding to the user identifier, calculates the purchase interval for each good purchased by the user, and judges for each good whose purchase interval was calculated whether or not the time corresponding to the purchase interval has lapsed after the latest purchase date. Information of each good for which the time corresponding to the purchase interval has lapsed is sent via the communication network 230 to the client 220 to display the information at the client 220. Observing the display screen, the user selects a good to be purchased, and enters an order and a settlement type. Accordingly, without an operation of selecting a desired good following specific menus, a user can easily select and order a desired good (or a good presumably desired from the past state of consumption). Further, the number of goods which is forgotten to be purchased is significantly reduced.

It is therefore possible to supply services suitable for user specific needs and conditions.

Goods whose purchase intervals are calculated are selected in accordance with the criterion which selects products or goods such as:

(1) product or good whose purchase frequency is a predetermined purchase frequency or higher, the purchase frequency being calculated from the purchase history information;

(2) product or good whose latest purchase day is a predetermined date or later, the latest purchase date being calculated from the purchase history information; and (3) a product or good whose purchase amount of money is a predetermined amount or more, the purchase amount of money being calculated from the purchase history information.

It is therefore possible to present a user with products or goods frequently purchased in the past or with expensive goods the merchandise provider wants to sell. Furthermore, even if the amount of purchase history information becomes bulky, the number of goods whose purchase intervals are calculated can be reduced so that the calculation of purchase intervals is performed in a short time and a response to a user can be improved.

In calculating the purchase interval, (1) an average interval of purchase days of merchandise purchased by a user,
(2) an average interval of purchase days per merchandise products or goods purchased by a user, which interval is then multiplied by the number of goods purchased at the latest purchase day, and the like are used.

Accordingly, it is possible to supply merchandise information quickly which precisely reflects the state of consumption of each user.

In the above embodiment, the purchase interval is calculated for each good. A plurality of goods may be considered to be a single merchandise group to calculate the purchase interval for each merchandise group and supply information of each merchandise group. In this case, at each of Steps 102 to 104 of the first embodiment, the process for each good is replaced by the process for each merchandise group. This modification can be easily anticipated by those skilled in the art so that the detailed description by using drawings is omitted.

Even if a user purchases goods having a different brand name in the same merchandise group such as "cleaning materials", these goods are processed as if they represent one good. Therefore, by incorporating the process for each merchandise group, proper merchandise information can be supplied without fail in accordance with the state of use of each user.

Next, the second embodiment will be described in which information of the purchase interval which has been calculated for each good in the previous shopping processes is used when a user identifier is input, and updating of the purchase interval information is performed after a series of shopping processes such as a settlement type is established, for the next use.

Figure 14:
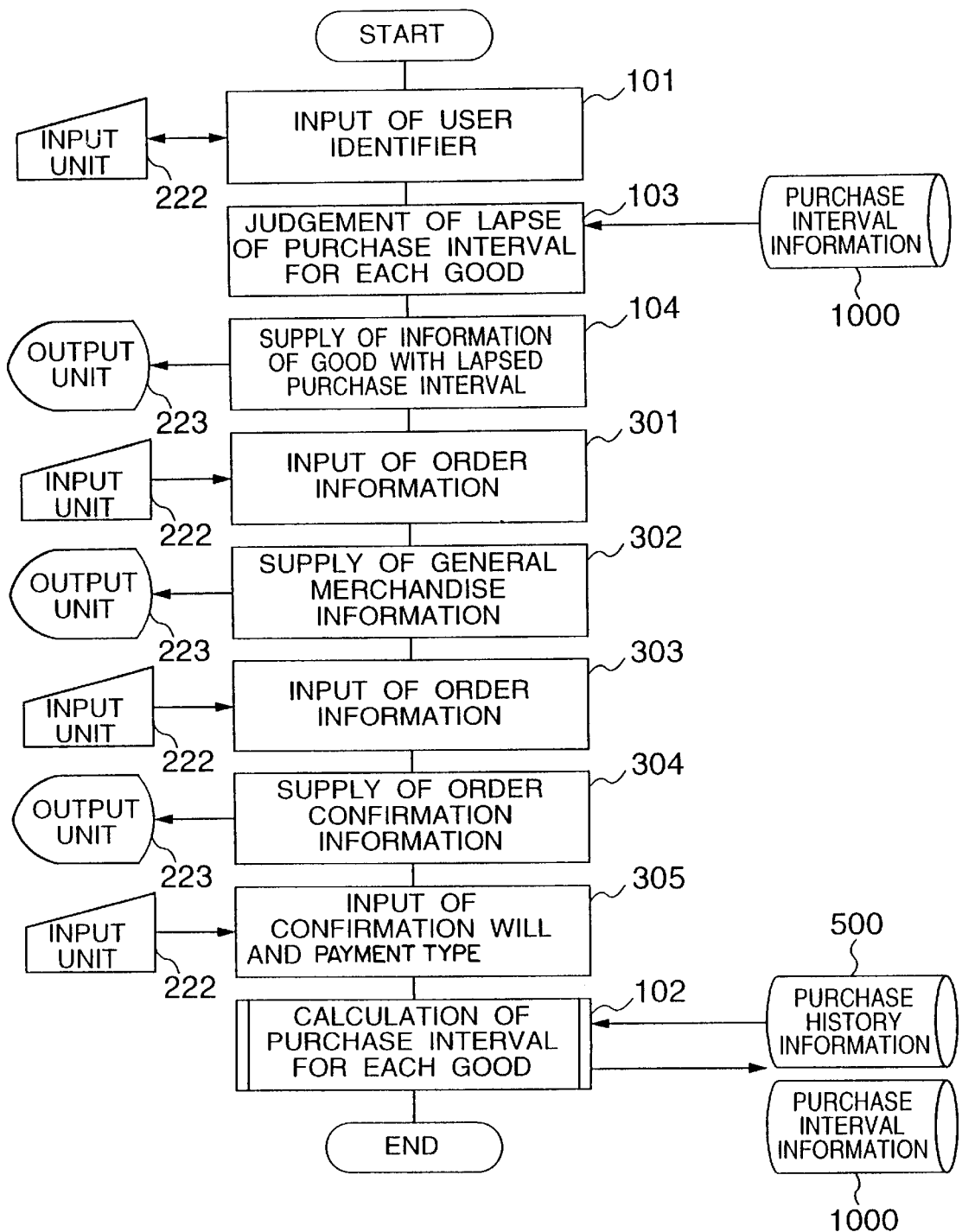
FIG. 14 is a flow chart illustrating the operation of a second embodiment of this invention.

FIG. 14 is a flow chart illustrating the operation of the online shopping method according to the second embodiment of the invention. The process flow of FIG. 14 has the same steps as the process flow shown in FIG. 3. The different point is that the purchase calculation process Step 102 is executed after the payment process Step 305, for the future use of the calculation result.

Specifically, at Step 102 following Step 305, after the user inputs a type and completes a series of online shopping, the purchase interval for each good is calculated and updated in accordance with the purchase history information 500. The calculation method is the same as the first embodiment, and the calculated and updated purchase interval is used when the same user accesses the server next.

Namely, at Step 103, in accordance with the purchase interval information 1000 calculated at the previous online shopping, a lapse of the purchase interval for each good is judged.

According to the second embodiment, therefore, when a user accesses the server, the purchase interval calculated at the previous online shopping is used so that merchandise information can be supplied quickly without a wait time required for calculating the purchase interval.

Next, the third embodiment will be described in which a user selects a display method for specific goods.

Figure 15:
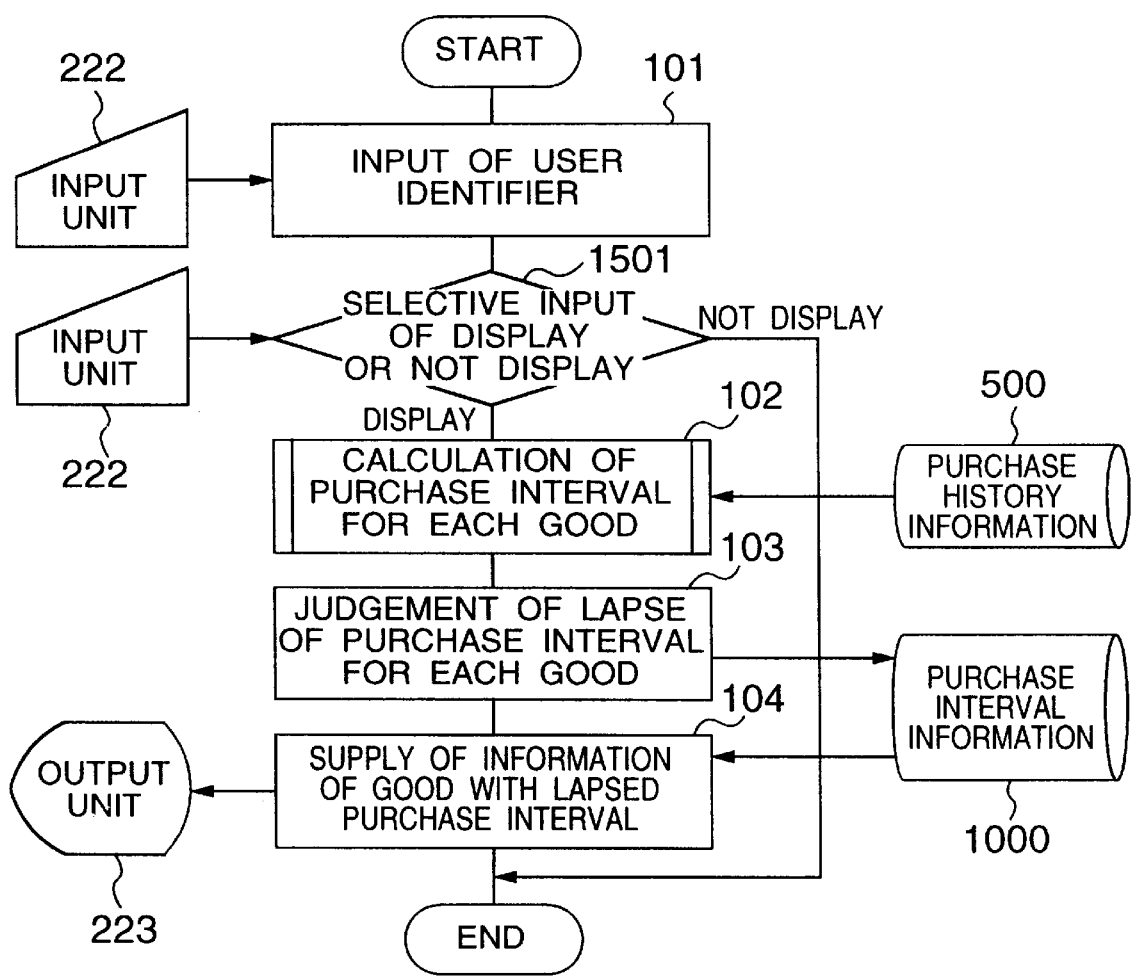
FIG. 15 is a flow chart illustrating the operation of a third embodiment of this invention.

FIG. 15 is a flow chart illustrating the operation of the online shopping support method according to the third embodiment of the invention. The different of the flow chart of FIG. 15 from that of FIG. 1 is that Step 1501 is inserted after Step 101. Steps after and before Step 1501 is the same as FIG. 1 and so the description thereof is omitted.

Step 1501: Selection of display of merchandise information.

Figure 16:
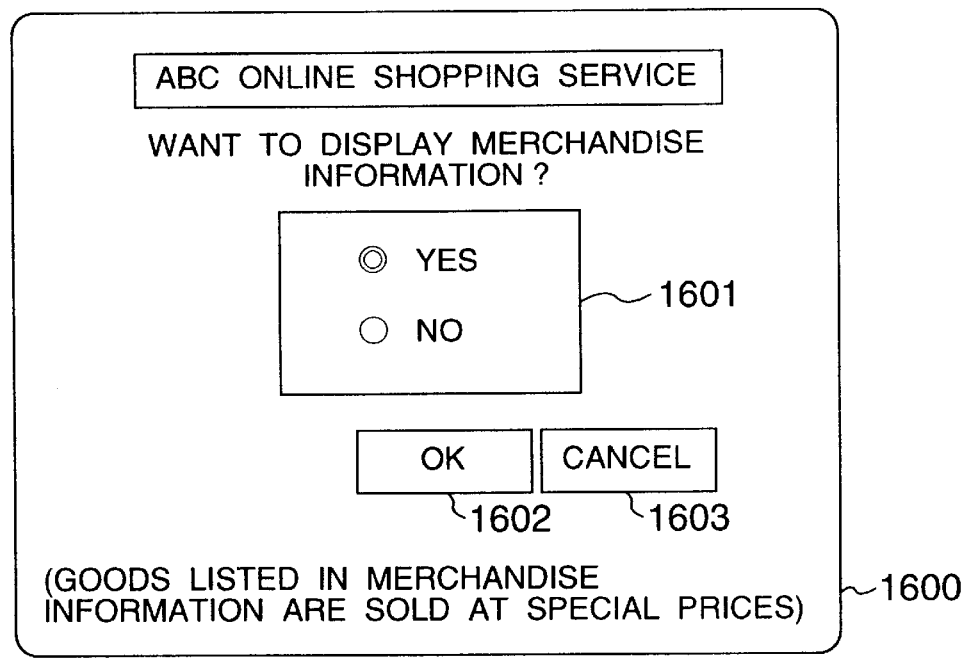
FIG. 16 is an illustrative diagram showing an example of a screen for selecting whether or not merchandise information is supplied.

A display selection screen 1601 such as shown in FIG. 16 is displayed in advance on the output unit 223 of the client 220. The display selection screen 1601 has an input area 1602 for instructing to display specific merchandise information (information of merchandise displayed in accordance with purchase history) and an input area 1603 for instructing not to display the specific merchandise information.

If not display is selected, Steps 102 to 104 are skipped in order not to display the specific merchandise information, whereas if display is selected, Step 102 and the following Steps are executed to supply the specific merchandise information in accordance with the purchase history. The detailed processes thereof are the same as the first embodiment.

According to the third embodiment, a user can select to display or not to display the specific merchandise information. Therefore, information can be supplied so as to match the state of a user, such as not to display information which is not suitable for user needs or to supply necessary information.

In practical operation, in order to promote a user to select to display the specific merchandise information, some bonus (such as special price and coupons) may be given.

Figure 17:
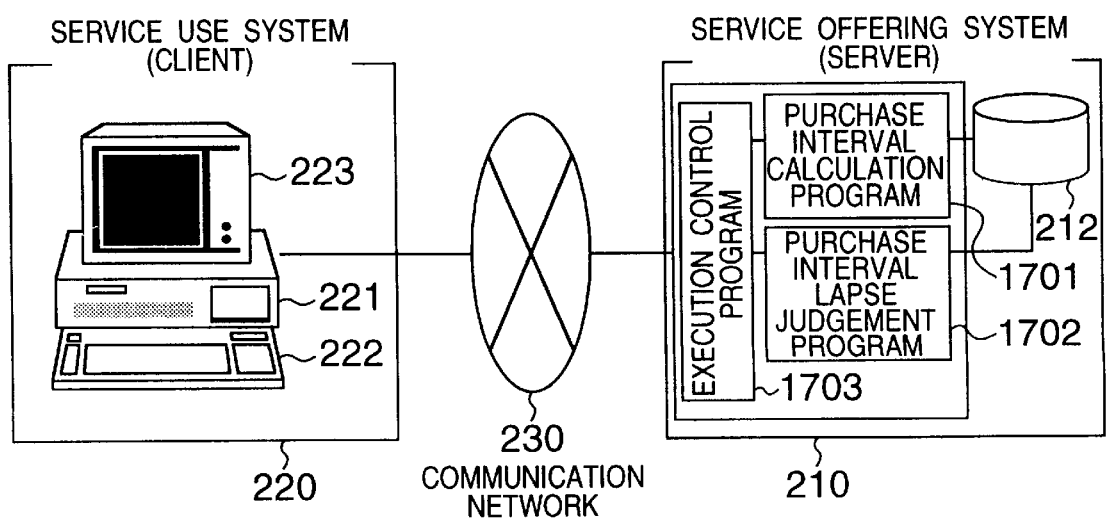
FIG. 17 is a functional diagram showing the functional structures required for an online shopping support system of this invention.

Next, the functional structures necessary for the computer 211 of the system shown in FIG. 2 will be described with reference to FIG. 17.

The functional structures necessary for the computer 211 include: the storage device 212 for storing merchandise purchase history information 500 for each user; search program means, responsive to an input of a user identifier from the client 220 to the server 210, for searching the purchase history information 500 of the user corresponding to the user identifier from the storage device 212; calculation program means 1701 for calculating a purchase interval for each good purchased by the user in accordance with the searched purchase history information 500; lapse judgement program means 1702 for judging whether the time corresponding to the purchase interval has lapsed after the latest purchase day; and supply information transmission program means for transmitting information of a good for which the time corresponding to the purchase interval has lapsed, via the communication network 230 to the client 220 to display the information on the output unit 223 of the client 220.

The search program means and supply information transmission program means includes an execution control program 1703.

These program means can be stored as application programs in a recording medium such as a floppy disk, a hard disk, and a semiconductor memory. The online shopping support described above can be realized under the above structure by installing the stored programs in a working memory of the server and executing the programs by a CPU.

Instead of directly loading the storage medium of the server, the application programs may be loaded via the communication network from an external program source to the memory of the server. In this case, software or hardware means for downloading the application programs is provided at the server.

In the above embodiments, although fundamental parts and functions necessary for online shopping support have been described, it is to be understood that in practical operations various other functions may be readily added in accordance with the needs of a user and a seller.

For example, voice guidance from the server may be added to further improve user services.

What is claimed is:

1. An online shopping support method for an online shopping support system including a service offering system, a service use system, and a communication network in which, in response to a shopping request, said service offering system executes an online shopping process including a merchandise information offering process and an order accepting process, said method comprising the steps of:

said service offering system storing purchase history information of each good purchased by each user;

said service offering system, in response to an input of identification information including a user identifier by said service use system, searching the purchase history information of the user corresponding to the user identifier and calculating a purchase interval of each good purchased by the user;

said service offering system determining for each good whose purchase interval was calculated whether a time corresponding to the purchase interval has lapsed after the latest purchase date when the identification information is input; and said service offering system, in accordance with the determination results, transmitting information of the good whose time corresponding to the purchase interval has lapsed to said service use system via said communication network and displaying the information at said service use system.

2. An online shopping support method according to claim 1, further comprising the step of calculating a purchase frequency for each good from the purchase history information of each user stored at said service offering system, and selecting a good whose calculated purchase frequency is at least a predetermined purchase frequency, as a good for which the purchase interval is calculated.

3. An online shopping support method according to claim 1, further comprising the step of calculating a latest purchase date of each good from the purchase history information of each user stored at said service offering system, and selecting a good whose calculated latest purchase date is a predetermined date or later, as a good for which the purchase interval is calculated.

4. An online shopping support method according to claim 1, further comprising the step of calculating a purchase amount of money of each good from the purchase history information of each user stored at said service offering system, and selecting a good whose calculated purchase amount of money is a predetermined amount of money or more as a good for which the purchase interval is calculated.

5. An online shopping support method according to claim 1, further comprising the step of calculating an average value of intervals of purchase days of each good purchased by a user to obtain said purchase interval.

6. An online shopping support method according to claim 1, further comprising the step of calculating an average interval of purchase days per merchangood purchased by a user, which interval is then multiplied by the number of goods purchased at the latest purchase day to thereby obtain said purchase interval.

7. An online shopping support method according to claim 1, further comprising the step of presuming at least two kinds of goods belonging to the same merchandise group and calculating a purchase interval for each merchandise group to thereby obtain said purchase interval.

8. An online shopping support method according to claim 1, further comprising the step of, said service offering system transmitting the merchandise information to a user of said service use system after a display by the user is confirmed.

9. An online shopping support method for an online shopping support system including a service offering system, a service use system, and a communication network in which, in response to a shopping request from said service use system, said service offering system executes an online shopping process including a merchandise information offering process and an order accepting process, said method comprising the steps of:

said service offering system storing purchase history information of each good purchased by each user;

said service offering system, in response to an input of identification information including a user identifier by said service use system, searching the purchase history information of the user corresponding to the user identifier and calculating a purchase interval of each good purchased by the user;

said service offering system determining for each good whose purchase interval was calculated whether a time corresponding to the purchase interval has lapsed after the latest purchase date when the identification information is input;

said service offering system, in accordance with the determination results, transmitting information of the good whose time corresponding to the purchase interval has lapsed to said service use system via said communication network and displaying the information at said service use system;

said service offering system, in response to an input of order information by the service use system with respect to the displayed information, transmitting confirmation of the order information to said service use system; and said service user system inputting a confirmation information response and a payment type.

10. An online shopping method for an online shopping support system including a service offering system, a service use system, and a communication network in which, in response to a shopping request from said service use system, said service offering system executes an online shopping process including a merchandise information offering process and an order accepting process, said method comprising the steps of:

said service offering system storing purchase history information of each good purchased by each user;

said service offering system, in response to an input of identification information including a user identifier by said service use system, searching the purchase history information of the user corresponding to the user identifier and calculating a purchase interval of each good purchased by the user;

said service offering system determining for each good whose purchase interval was calculated whether a time corresponding to the purchase interval has lapsed after the latest purchase date when the identification information is input;

said service offering system, in accordance with the determination results, transmitting information of the good whose time corresponding to the purchase interval has lapsed to said service use system via said communication network and displaying the information at said service use system;

said service offering system, in response to an input of order information by the service use system with respect to the displayed information, transmitting confirmation of the order information to said service use system;

said service user system inputting a confirmation information response and a payment type; and said service offering system calculating the purchase interval of each good purchased by the user corresponding to the user identifier, in accordance with the purchase history information having already been stored at said service offering system, and storing the calculated purchase interval in the purchase history information to update the purchase history information.

11. An online shopping support system including a service offering system, a service use system, and a communication network in which, in response to a shopping request from the service use system, the service offering system executes an online shopping process including a merchandise information offering process and an order accepting process, said online shopping support system comprising:

storage means for storing purchase history information of each good purchased by each user;

search means for searching, in response to an input of identification information including a user identifier by said service use system, the purchase history information of the user corresponding to the user identifier from said storage means;

calculating means for calculating a purchase interval of good purchased by the user in accordance with the searched purchase information;

determining means for determining for each good whose purchase interval was calculated whether a time corresponding to the purchase interval has lapsed after the latest purchase date when the identification information is input; and supply information transmitting means for transmitting, in accordance with the determination results, information of the good whose time corresponding to the, purchase interval has lapsed to said service use system via said communication network and displaying the information at said service use system.

12. An online shopping support system according to claim 11, wherein said supply information transmitting means includes means, responsive to a shopping request from said service use system, for transmitting information of a good for which the time corresponding to the purchase interval has lapsed and information of other goods.

13. An online shopping support system according to claim 11, further comprising load means for downloading a computer implemented program which supports the operation of a service offering system operating an online shopping system constituted of the service offering system, a service use system, and a communication network, and the operation of the service offering system in which in response to a shopping request from the service use system via the communication network, the service offering system executes a process necessary at least for online shopping and supplies the service use system with shopping information, said computer implemented program comprising:

storage program means for storing purchase history information of each good purchased by each user in a memory of said service offering system;

search program means for searching, in response to an input of identification information including a user identifier by said service use system, the purchase history information of the user corresponding to the user identifier from said memory;

calculation program means for calculating a purchase interval of each good purchased by the user in accordance with the searched purchase information;

judging program means for judging for each good whose purchase interval was calculated whether the time corresponding to the purchase interval has lapsed after the latest purchase date when the identification information is input; and supply information transmission program means for transmitting, in accordance with the judgement results, information of at least a good whose time corresponding to the purchase interval has lapsed to said service use system via said communication network and displaying the information at said service use system.

14. A computer-readable recording medium for storing a program which supports the operation of a service offering system operating an online shopping system including a service offering system, a service use system, and a communication network, and the operation of the service offering system in which in response to a shopping request from the service use system via the communication network, the service offering system executes a process necessary at least for online shopping and supplies the service use system with shopping information, said computer-readable recording medium comprising:

storage program means for storing purchase history information of each good purchased by each use in a memory of said service offering system;

search program means for searching, in response to an input of identification information including a user identifier by said service use system, the purchase history information of the user corresponding to the user identifier from said memory;

calculation program means for calculating a purchase interval of each good purchased by the user in accordance with the searched purchase information;

determining program means for determining for each good whose purchase interval was calculated whether a time corresponding to the purchase interval has lapsed after the latest purchase date when the identification information is input; and supply information transmission program means for transmitting, in accordance with the determination results, information of at least a good whose time corresponding to the purchase interval has lapsed to said service use system via said communication network and displaying the information at said service use system.

15. A recording medium according to claim 14, further comprising program means, responsive to an input of order information from the user with-respect to the shopping information displayed at said service use system, for transmitting confirmation information of the order information to said service use system, and program means for instructing said service use system to input a response to the transmitted confirmation information and a settlement type.

16. A recording medium according to claim 15, further comprising program means, responsive to a completion of an input of the response to the transmitted confirmation information and the settlement type, for updating the purchase history information of each good stored in said memory and corresponding to the user identifier, calculating the purchase interval for each good purchased by the user in accordance with the updated purchase history information, and storing in said memory the calculated purchase interval as part of the purchase history information.

* * * * *